US012760606B2

(12) United States Patent
Gutierrez et al.

(10) Patent No.: US 12,760,606 B2
(45) Date of Patent: Oct. 13, 2026

(54) DETERMINATION OF TUBULAR CONNECTION HEIGHT ABOVE A RIG FLOOR

(71) Applicant: WEATHERFORD TECHNOLOGY HOLDINGS, LLC, Houston, TX (US)

(72) Inventors: Leonardo J. Gutierrez, Cypress, TX (US); Jan Rothe, Hannover (DE); Edecio J. Nunez Parra, Katy, TX (US); Cameron B. Kirkpatrick, Houston, TX (US)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 143 days.

(21) Appl. No.: 18/407,669

(22) Filed: Jan. 9, 2024

(65) Prior Publication Data

US 2025/0223877 A1 Jul. 10, 2025

Related U.S. Application Data

(60) Provisional application No. 63/618,459, filed on Jan. 8, 2024.

(51) Int. Cl.
*E21B 19/16* (2006.01)
*G01B 17/00* (2006.01)

(52) U.S. Cl.
CPC ............ *E21B 19/165* (2013.01); *G01B 17/00* (2013.01)

(58) Field of Classification Search
CPC .............................. E21B 19/165; G01B 17/00
(Continued)

(56) References Cited

U.S. PATENT DOCUMENTS 3,434,046 A 3/1969 Wilson et al.
4,698,631 A 10/1987 Kelly, Jr. et al.
(Continued)

FOREIGN PATENT DOCUMENTS

CN 101017155 B 9/2010
RU 2394235 C1 7/2010

OTHER PUBLICATIONS

English Translation of CN 101017155 abstract, dated Feb. 13, 2024, 1 page.

(Continued)

*Primary Examiner* — Yuqing Xiao
*Assistant Examiner* — Christopher Richard Walker
(74) *Attorney, Agent, or Firm* — Smith IP Services, P.C.

(57) ABSTRACT

A tubular connection position measurement system can include an acoustic transmitter secured with a rotary table, and an acoustic receiver secured with the rotary table. Another tubular connection position measurement system can include an acoustic transmitter, an acoustic receiver, and a controller configured to adjust a position of a tong assembly, based on a transit time of an acoustic signal transmitted in a tubular and received by the acoustic receiver. A method of determining a tubular connection position can include transmitting an acoustic signal through a tubular, a portion of the tubular being positioned above a rig floor, receiving a reflection of the acoustic signal, and determining a height of the portion of the tubular above the rig floor, based on a transit time of the transmitted and reflected acoustic signal through the portion of the tubular.

17 Claims, 4 Drawing Sheets

(58) Field of Classification Search
USPC .......................................................... 367/118
See application file for complete search history.

(56) References Cited

U.S. PATENT DOCUMENTS

| | | | | |
|---|---|---|---|---|
| 9,322,950 | B2 | 4/2016 | Gustavsson et al. | |
| 9,464,492 | B2 | 10/2016 | Austefjord et al. | |
| 10,167,717 | B2 | 1/2019 | Disko et al. | |
| 10,465,505 | B2 | 11/2019 | Disko et al. | |
| 10,612,366 | B2 | 4/2020 | Gilleland et al. | |
| 10,995,571 | B2 | 5/2021 | Zheng et al. | |
| 11,112,513 | B2 | 9/2021 | Khadhraoui et al. | |
| 11,702,894 | B2 | 7/2023 | Holck | |
| 2009/0078413 | A1 | 3/2009 | Tubel et al. | |
| 2014/0233804 | A1* | 8/2014 | Gustavsson | E21B 19/165 382/103 |
| 2015/0000095 | A1 | 1/2015 | Iizuka et al. | |
| 2016/0305232 | A1* | 10/2016 | Bird | E21B 47/001 |
| 2018/0051526 | A1* | 2/2018 | Zouhair | E21B 19/07 |
| 2019/0136650 | A1* | 5/2019 | Zheng | E21B 3/02 |
| 2020/0278193 | A1* | 9/2020 | Orban | E21B 17/006 |

OTHER PUBLICATIONS

English Translation of RU 2394235 abstract, dated Feb. 13, 2024, 1 page.

* cited by examiner

DETERMINATION OF TUBULAR CONNECTION HEIGHT ABOVE A RIG FLOOR

CROSS-REFERENCE TO RELATED APPLICATION

This application claims the benefit of the filing date of U.S. provisional application No. 63/618,459 filed on 8 Jan. 2024. The entire disclosure of the prior application is incorporated herein by this reference in its entirety for all purposes.

BACKGROUND

This disclosure relates generally to equipment utilized and operations performed in conjunction with a subterranean well and, in an example described below, more particularly provides for acoustic detection of a position of a tool joint or other tubular connection in a well site operation.

Oilfield tubulars (such as, tubing, drill pipe, casing, liner, etc.) can be connected together or disconnected when respectively running the tubulars into a well or retrieving the tubulars from the well. A tong assembly is commonly used to make up connections between tubulars, or to break out such tubular connections. A top drive can also be used to make up tubular connections.

It will be appreciated that improvements are continually needed in the art of making up and breaking out tubular connections in well site operations. The disclosure below provides such improvements, which may be used in a wide variety of different types of well site operations.

DETAILED DESCRIPTION

Figure 1:
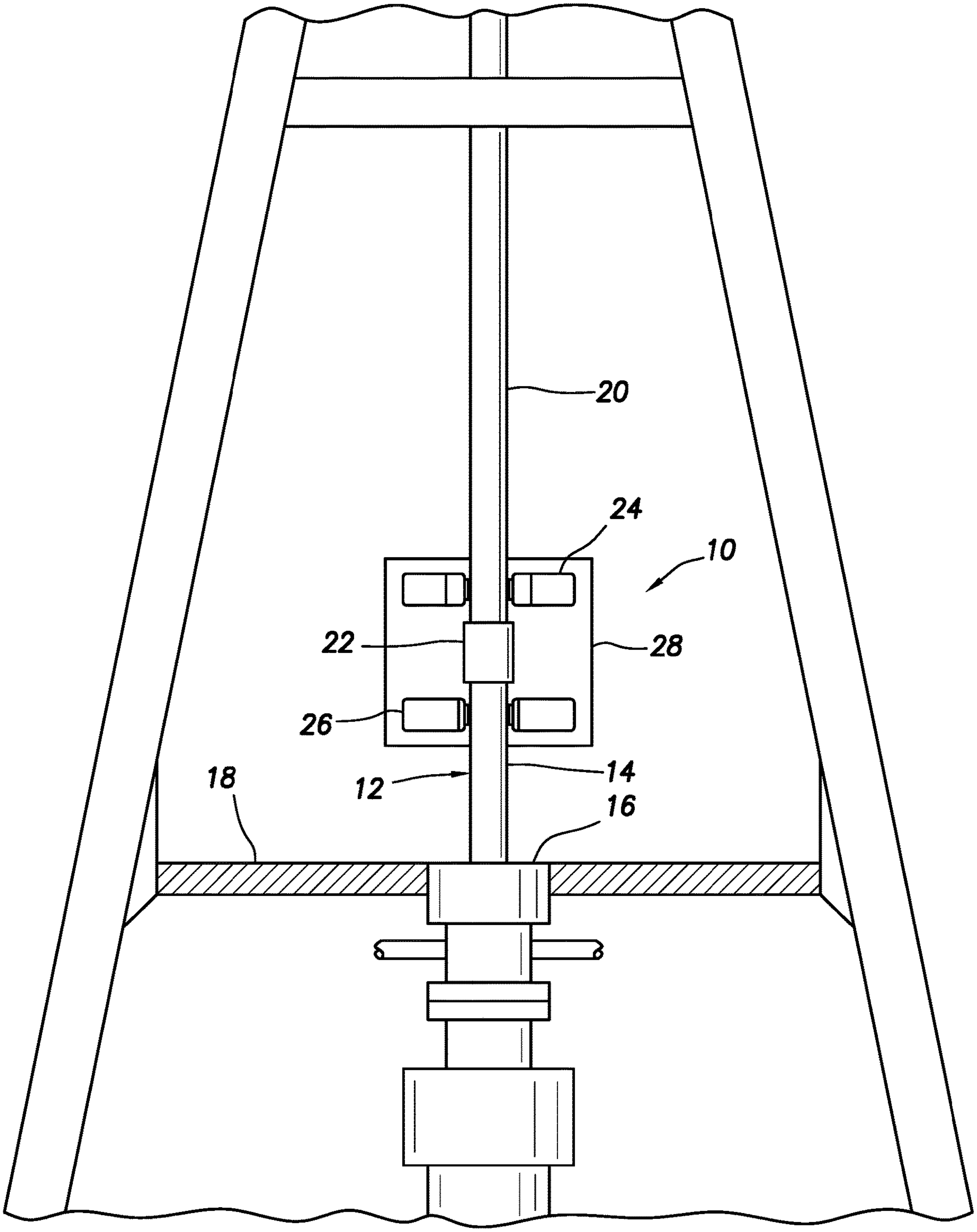
FIG. 1 is a representative partially cross-sectional view of an example of a well system and associated method which can embody principles of this disclosure.

Representatively illustrated in FIG. 1 is a system 10 for use with a subterranean well, and an associated method, which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a tubular string 12 is being retrieved from a well. The tubular string 12 in this example is a production or injection tubing string, but in other examples the tubular string could be a casing, liner, drill pipe, completion, stimulation, testing or other type of tubular string. The scope of this disclosure is not limited to use of any particular type of tubular string or tubular components connected in a tubular string.

As depicted in FIG. 1, a tubular 14 is suspended near its upper end by means of a rotary table 16, which may comprise a pipe handling spider and/or safety slips to grip the tubular 14 and support a weight of the tubular string 12. In this manner, the upper end of the tubular 14 extends upwardly through a rig floor 18 in preparation for disconnecting another tubular 20 from the tubular string 12.

In this example, a tubular coupling 22 is used to connect the upper end of the tubular 14 to the lower end of the tubular 20 when the tubular string 12 is assembled and run into the well. The coupling 22 is internally threaded in each of its opposite ends.

In conventional well operations, it is common for a threaded together tubular and coupling to be referred to as a "joint" and for threaded together joints to be referred to as a "stand" of tubing, casing, liner, pipe, etc. However, in some examples, a separate coupling may not be used; instead one end (typically an upper "box" end of a joint) is internally threaded and the other end (typically a lower "pin" end of the joint) is externally threaded, so that successive joints can be threaded directly to each other. Thus, the scope of this disclosure can encompass the use of a separate coupling with a tubular, or the use of a tubular without a separate coupling (in which case the coupling can be considered to be integrally formed with, and a part of, the tubular). In the FIG. 1 example, the coupling 22 can also be considered to be a tubular, since it is a tubular component connected in the tubular string 12.

To break out a threaded connection between the tubular 20 and the coupling 22, a tong assembly 28, including a set of tongs or rotary and backup clamps 24, 26, are used. The rotary clamp 24 in the FIG. 1 example is used to grip, rotate and apply torque to the upper tubular 20 as it is unthreaded from the coupling 22. The backup clamp 26 in the FIG. 1 example is used to grip and secure the lower tubular 14 against rotation, and to react the torque applied by the rotary clamp 24. The rotary clamp 24 and the backup clamp 26 may be separate devices, or they may be components of a rig apparatus known to those skilled in the art as an "iron roughneck."

In one example, the rotary clamp 24 and backup clamp 26 may be components of a tong system, such as the VERO™ tong system marketed by Weatherford International, Inc. of Houston, Texas USA. In this example, the rotary clamp 24 may be a mechanism of the tong system that rotates and applies torque to the upper tubular 20, and the backup clamp 26 may be a backup mechanism of the tong system that reacts the applied torque and prevents rotation of the lower tubular 14. Thus, the term "rotary clamp" as used herein indicates the rotation and torque application mechanism, and the term "backup clamp" as used herein indicates the torque reacting mechanism.

After the upper tubular 20 is unthreaded from the lower tubular 14 or coupling 22, the tubular string 12 can be raised further from the well, and the break out operation can be repeated to disconnect another stand from the upper end of the tubular string. In this manner, the tubular string 12 is progressively retrieved from the well by disconnecting successive stands from the upper end of the tubular string. In some examples, an individual tubular component may be disconnected from the tubular string 12, instead of a stand.

In the FIG. 1 method, the threaded connection break out process can be controlled, so that a tubular connection is properly broken out, and this control can be automatic, so that human error is avoided and safety is enhanced by reducing the need for a human presence on the rig floor during retrieval of the tubular string 12. Furthermore, this technology can also be used to avoid error and enhance safety when making up tubular connections, for example, when the tubular string 12 is run into the well.

Figure 2:
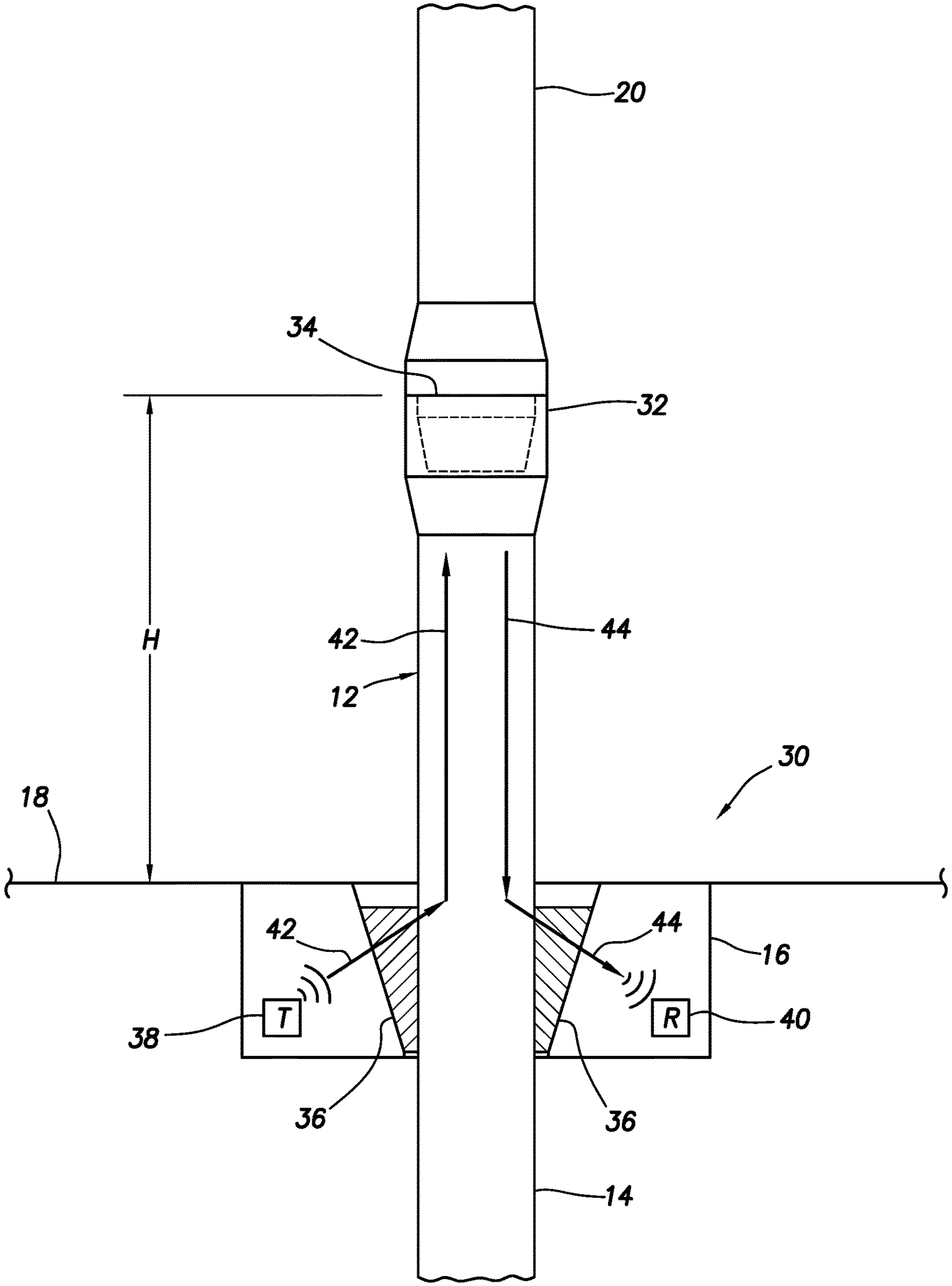
FIG. 2 is a representative side view of an example of a tubular connection position measurement system and associated method which can embody the principles of this disclosure.

Referring additionally now to FIG. 2, a side view of an example of a tubular connection position measurement system 30 and associated method is representatively illustrated. For convenience and clarity, the measurement system 30 is described below as it may be used for breaking out a tubular connection 32 when retrieving the tubular string 12 from the well in the FIG. 1 well system 10. However, it should be clearly understood that the measurement system 30 may be used with other well systems and for other purposes (such as, making up tubular connections) in keeping with the scope of this disclosure.

In the FIG. 2 example, the coupling 22 is not used. Instead, the lower end of the upper tubular 20 is threaded directly into the upper end of the lower tubular 14. Thus, when the tong assembly 28 is used to break out the tubular connection 32, it is desired for the rotary clamp 24 to be positioned above an external interface 34 (at the upper end of the lower tubular 14 in this example) between the upper and lower tubulars 20, 14, and for the backup clamp 26 to be positioned below the external interface 34. In this manner, the rotary clamp 24 can grip the upper tubular 20 above the interface 34 and the backup clamp 26 can grip the lower tubular 14 below the interface, in order to thereby apply torque to break out the tubular connection 32.

The lower tubular 14 is secured vertically by slips 36 installed in the rotary table 16. The slips 36 grip an external surface of the lower tubular 14 to thereby vertically suspend the tubular 14, so that its upper end is positioned above the rig floor 18. However the height H of the tubular 14 above the rig floor 18 is not always the same for every tubular in the multiple break outs conducted when the tubular string 12 is retrieved from the well. Therefore, a height of the tong assembly 28 must be adjusted, if needed, to accommodate different heights H, so that the rotary clamp 24 will be positioned above the interface 34 and the backup clamp 26 will be positioned below the interface, for each break out procedure.

As depicted in FIG. 2, the system 30 includes an acoustic transmitter 38 and an acoustic receiver 40 for measuring the height H of the interface 34 above the rig floor 18. The transmitter 38 and receiver 40 are received in or secured with the rotary table 16 in this example, since the slips 36 provide a suitable acoustic coupling between the rotary table and the tubular 14. However, the transmitter 38 or receiver 40 may be otherwise positioned in other examples.

The transmitter 38 and receiver 40 may comprise any types of devices suitable for transmitting or receiving acoustic signals in the system 30. For example, piezoelectric, electromagnetic, magnetostrictive or other types of devices may be used. The acoustic signals may comprise any frequencies and amplitudes suitable for transmission through the tubular 14, the slips 36, the rotary table 16, or any other components or combination of components in which the acoustic signals may be propagated. The scope of this disclosure is not limited to any particular type of acoustic transmitter, receiver or signal used in the system 30.

In the FIG. 2 example, the transmitter 38 transmits an acoustic signal 42 to the tubular 14. The acoustic signal 42 is coupled to the tubular 14 via one or more of the slips 36. In other examples, if the transmitter 38 is not positioned in the rotary table 16, then the acoustic signal 42 may be otherwise coupled to the tubular 14.

As depicted in FIG. 2, the acoustic signal 42 is transmitted through the upper portion of the tubular 14 to the tubular connection 32. As will be appreciated by those skilled in the art, the tubular connection 32 presents an abrupt change in acoustic impedance. As a result, a reflection 44 of the acoustic signal 42 will be transmitted back through the upper portion of the tubular 14 toward the rotary table 16.

The acoustic signal reflection 44 is coupled from the tubular 14 to the rotary table 16 by at least one of the slips 36. The receiver 40 receives the acoustic signal reflection 44 in or on the rotary table 16 in the FIG. 2 example.

As described more fully below, by measuring transit times of the acoustic signal 42 and its reflection 44, a measurement of the height H of the tubular connection 32 above the rig floor 18 can be determined. The height of the tong assembly 28 (see FIG. 1) can then be adjusted, so that the rotary clamp 24 is positioned above the interface 34 and the backup clamp 26 is positioned below the interface. This height H determination and adjustment of the tong assembly 28 height can be automated, so that human intervention in this process is not required.

Figure 3:
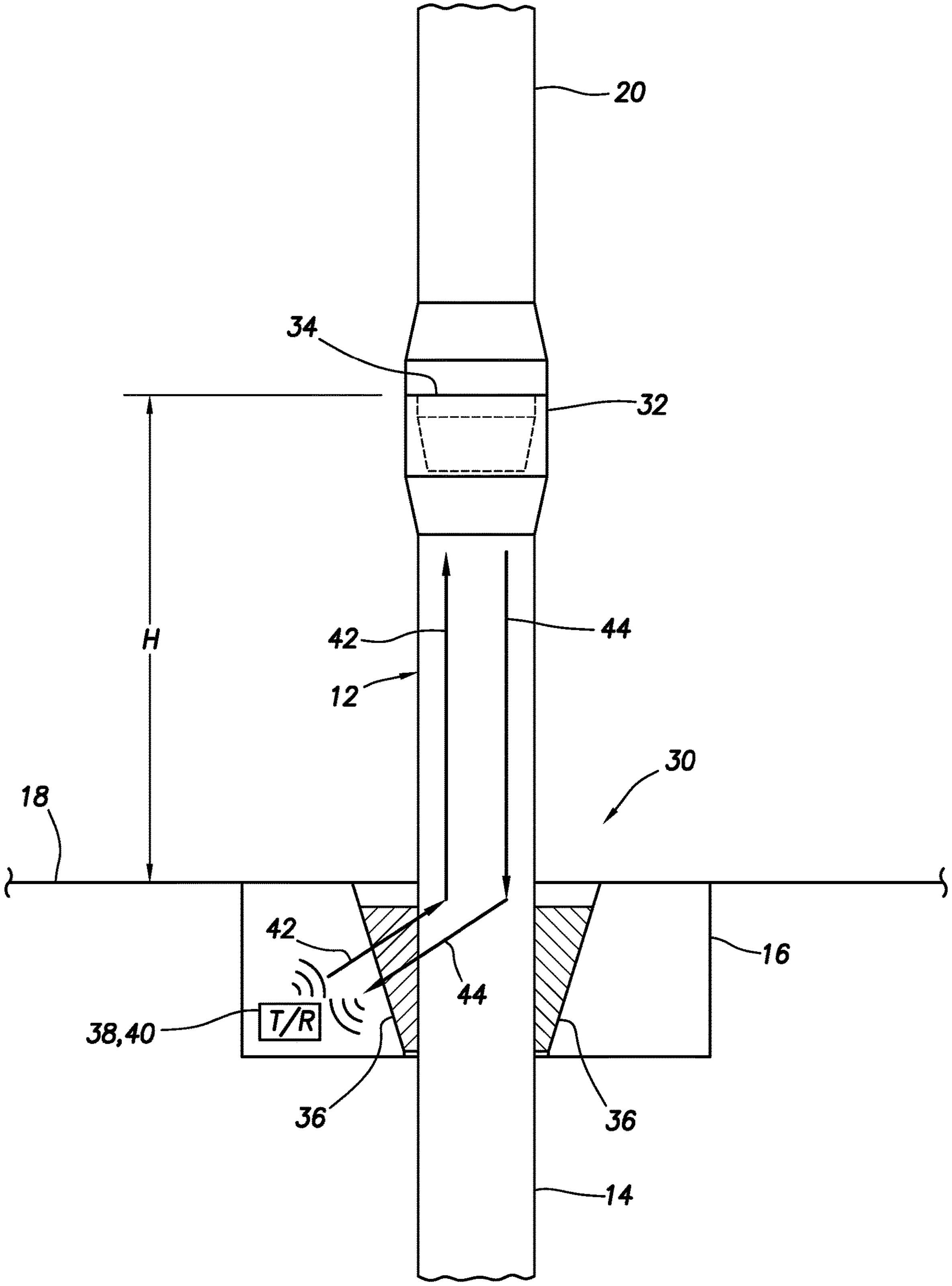
FIG. 3 is a representative side view of another example of the tubular connection position measurement system.

Referring additionally now to FIG. 3, a side view of another example of the tubular connection position measurement system 30 is representatively illustrated. The FIG. 3 system 30 is substantially similar to the FIG. 2 example, but differs at least in that the acoustic transmitter 38 and the acoustic receiver 40 are integrated into a single component (e.g., an acoustic transceiver).

In the FIG. 3 example, the acoustic transceiver 38, 40 is received in or secured with the rotary table 16, so that the acoustic signal 42 is coupled to the tubular 14 via one or more of the slips 36. The reflection 44 of the acoustic signal 42 may be coupled from the tubular 14 to the transceiver 38, 40 via the same one or more slips 36.

Figure 4:
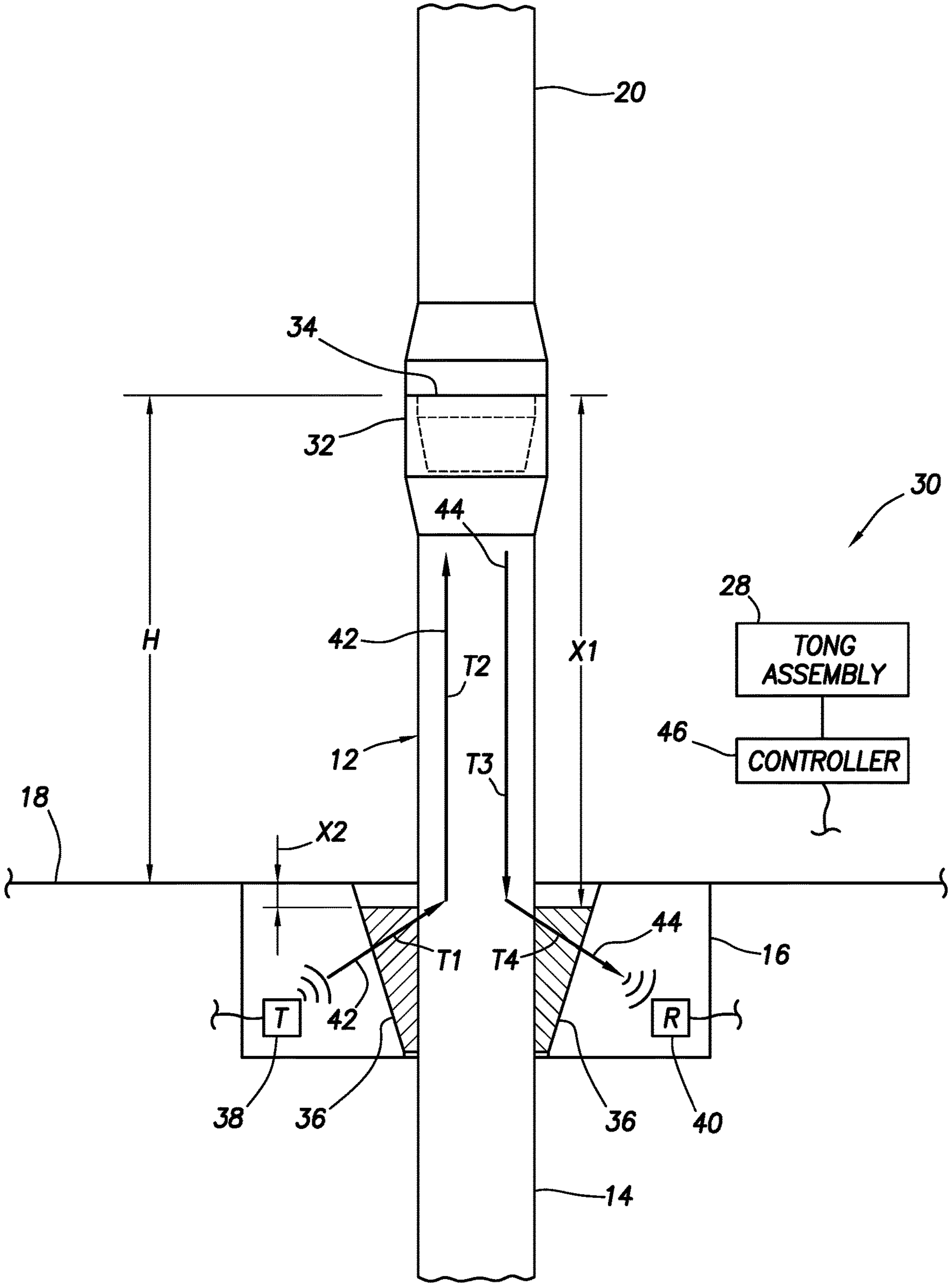
FIG. 4 is a representative side view of an example of a method of determining the tubular connection position relative to a rig floor.

Referring additionally now to FIG. 4, the FIG. 2 system 30, along with notations for an example of a method of determining the tubular connection 32 position relative to the rig floor 18, is representatively illustrated. The method may be used with the FIG. 3 system 30 as well, or it may be used with other acoustic measurement systems, with suitable modifications as needed.

In the notation used in the FIG. 4 example, X1 is a vertical distance between the slips 36 and the interface 34 at the top of the lower tubular 14. X2 is a vertical distance between an upper surface of the rig floor 18 and the slips 36. T1 is a transit time of the acoustic signal 42 from the transmitter 38 to the tubular 14. T2 is a transit time of the acoustic signal 42 in the tubular 14 from the slips 36 to the tubular connection 32. T3 is a transit time of the acoustic signal reflection 44 from the tubular connection 32 to the slips 36. T4 is the transit time of the reflection 44 from the tubular 14 to the receiver 40.

A total transit time TT of the acoustic signal 42 and its reflection 44 is given by: $TT=T1+T2+T3+T4$. This total transit time TT can be conveniently measured in the FIG. 4 method by measuring the time difference between transmitting the acoustic signal 42 from the transmitter 38 and receiving the reflection 44 at the receiver 40. For example, a controller 46 connected to the transmitter 38 and receiver 40 may be used to initiate the acoustic signal 42 transmission by the transmitter 38, and to detect when the reflection 44 is received at the receiver 40.

The height H is given by: $H=X1-X2$. The distance X2 will remain constant over multiple break out or make up operations, assuming the same rotary table 16 and slips 36 are used, so X2 can be physically measured, or determined empirically by measuring total transit time TT for multiple different heights H and solving the resulting system of multiple linear equations.

The distance X1 is given by: X1=((T2+T3)/2) SS, in which SS is the speed of sound in the tubular 14 material. For example, if the tubular 14 is made of steel, SS is approximately 5960 meters/second.

For a given physical configuration (e.g., using the same rotary table 16 and slips 36), the transit times T1 and T4 should remain constant. These values can be measured, or determined empirically.

From the above, it will be appreciated that the height H is given by: H=((TT−T1−T4)/2) SS. Since T1, T4 and SS are constants (for a given physical configuration), it can be seen that the height H can be readily calculated once the variable total transit time TT is measured. This calculation may be performed, for example, with software, instructions, etc., of the controller 46.

The controller 46 may be any type of controller or computing system capable of storing software or instructions for initiating the transmission of the acoustic signal 42 from the transmitter 38, detecting the arrival of the signal reflection 44 at the receiver 40, recording the total transit time TT, calculating the height H, and controlling operation of the tong assembly 28, so that a vertical height of the tong assembly is appropriately adjusted to match the height H. Controlling operation of the tong assembly 28 may include communicating to the tong assembly 28 an indication of the height H, so that an internal control system of the tong assembly will appropriately adjust its vertical height relative to the rig floor 18.

The controller 46 can in some examples be divided into multiple components, or it may be incorporated into the tong assembly 28 itself. The controller 46 may comprise a programmable logic controller or other suitable device for performing any or all of the functions described above.

Although in the above description only the acoustic signal reflection 44 is discussed as being received at the receiver 40, it will be appreciated by those skilled in the art that most likely multiple reflections and noise will also be received at the receiver. In the examples described above, the reflection 44 refers to the first reflection of the acoustic signal 42 off of the tubular connection 32. Appropriate frequency and time filtering can be applied to the receiver's 40 output, so that the arrival of the first reflection 44 can be reliably detected.

In a tubular connection break out procedure, the height H above the rig floor 18 of interest is that of the interface 34 between the top end of the lower tubular 14 and the bottom end of the upper tubular 20. In a tubular connection make up procedure, there is not yet a fully contacting interface between the lower and upper tubulars 14, 20 when an adjustment of the height of the tong assembly 28 is needed.

Thus, in the make up procedure, the height H of interest is that of the top end of the lower tubular 14. It will be appreciated by those skilled in the art that, although the upper tubular 20 is not yet fully made up to the lower tubular 14, the acoustic signal 42 will still be reflected at the top end of the lower tubular, due to the abrupt change in acoustic impedance at the top end of the lower tubular. The controller 46 can cause the height of the tong assembly 28 to be adjusted, based on the total transit time TT and the calculated height H.

It may now be fully appreciated that the above disclosure provides significant advancements to the art of making up and breaking out tubular connections in well site operations. In examples described above, a height H of a tubular connection 32 can be conveniently determined, so that a height of a tong assembly 28 can be readily adjusted as needed to make up or break out the tubular connection.

The above disclosure provides to the art a tubular connection position measurement system 30 for use with a subterranean well. In one example, the system 30 can comprise an acoustic transmitter 38 secured with a rotary table 16, and an acoustic receiver 40 secured with the rotary table 16.

The acoustic transmitter 38 may be configured to transmit an acoustic signal 42 to a tubular 14 secured in the rotary table 16. The acoustic receiver 40 may be configured to receive a reflection 44 of the acoustic signal 42. The acoustic receiver 40 may be configured to receive a reflection 44 of the acoustic signal 42 off of a tubular connection 32. The acoustic transmitter 38 and the acoustic receiver 40 may be integrated into a same component.

The system 30 may include a controller 46 configured to determine a height H of a tubular connection 32 above a rig floor 18. The controller 46 may be further configured to determine the height H based on a transit time TT of a transmitted and reflected acoustic signal 42 in a tubular 14 secured in the rotary table 16.

Another tubular connection position measurement system 30 for use with a subterranean well can comprise an acoustic transmitter 38, an acoustic receiver 40, and a controller 46 configured to adjust a position of a tong assembly 28. The adjustment is based on a transit time TT of an acoustic signal 42 transmitted in a tubular 14 and received by the acoustic receiver 40.

The acoustic transmitter 38 may be configured to transmit the acoustic signal 42 to a tubular 14 secured in a rotary table 16. The acoustic receiver 40 may be configured to receive a reflection 44 of the acoustic signal 42. The acoustic transmitter 38 and the acoustic receiver 40 may be secured with a rotary table 16.

Also provided to the art by the above disclosure is a method of determining a tubular connection 32 position. In one example, the method can comprise transmitting an acoustic signal 42 through a tubular 14, a portion of the tubular 14 being positioned above a rig floor 18; receiving a reflection 44 of the acoustic signal 42; and determining a height H of the portion of the tubular 14 above the rig floor 18, based on a transit time TT of the transmitted and reflected acoustic signal 42 through the portion of the tubular 14.

In the reflecting step, the acoustic signal 42 may be reflected off of an end of the tubular 14, or another portion of a tubular connection 32.

The method may include securing an acoustic transmitter 38 and an acoustic receiver 40 with a rotary table 16. The transmitting step may include transmitting the acoustic signal 42 through a slip 36 that supports the tubular 14 in the rotary table 16. The receiving step may include receiving the reflected acoustic signal 42 through a slip 36 that supports the tubular 14 in the rotary table 16.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used.

Instead, any of the features described above can be used, without any other particular feature or features also being used.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A tubular connection position measurement system for use with a subterranean well, the system comprising:

an acoustic transmitter secured with a rotary table;

an acoustic receiver secured with the rotary table; and a controller configured to determine a height of a tubular connection above a rig floor based on a time required for a transmitted and reflected acoustic signal to travel longitudinally through a tubular secured in the rotary table.

2. The system of claim 1, in which the acoustic transmitter is configured to transmit the acoustic signal to the tubular secured in the rotary table.

3. The system of claim 1, in which the acoustic receiver is configured to receive a reflection of the acoustic signal.

4. The system of claim 1, in which the acoustic receiver is configured to receive a reflection of the acoustic signal off of a tubular connection.

5. The system of claim 1, in which the acoustic transmitter and the acoustic receiver are integrated into a same component.

6. A tubular connection position measurement system for use with a subterranean well, the system comprising:

an acoustic transmitter configured to transmit an acoustic signal longitudinally through a tubular;

an acoustic receiver configured to receive a reflection of the acoustic signal, in which the reflection is transmitted back longitudinally through the tubular; and a controller configured to adjust a position of a tong assembly, based on a time required for the acoustic signal and the reflection of the acoustic signal to travel longitudinally through the tubular.

7. The system of claim 6, in which the acoustic transmitter is configured to transmit the acoustic signal to the tubular secured in a rotary table.

8. The system of claim 6, in which the acoustic receiver is configured to receive the reflection of the acoustic signal off of a tubular connection.

9. The system of claim 6, in which the acoustic transmitter and the acoustic receiver are integrated into a same component.

10. The system of claim 6, in which the controller is further configured to determine a height of a tubular connection above a rig floor.

11. The system of claim 6, in which the acoustic transmitter and the acoustic receiver are secured with a rotary table.

12. A method of determining a tubular connection position, the method comprising:

transmitting an acoustic signal longitudinally through a tubular, wherein a portion of the tubular is positioned above a rig floor;

receiving a reflection of the acoustic signal; and determining a height of the portion of the tubular above the rig floor, based on a time required for the transmitted and reflected acoustic signal to travel longitudinally through the portion of the tubular.

13. The method of claim 12, in which in the reflecting, the acoustic signal is reflected off of an end of the tubular.

14. The method of claim 12, in which in the reflecting, the acoustic signal is reflected off of a tubular connection.

15. The method of claim 12, further comprising securing an acoustic transmitter and an acoustic receiver with a rotary table.

16. The method of claim 15, in which the transmitting further comprises transmitting the acoustic signal through a slip that supports the tubular in the rotary table.

17. The method of claim 15, in which the receiving further comprises receiving the reflected acoustic signal through a slip that supports the tubular in the rotary table.

* * * * *